(12) United States Patent
Jagan et al.

(10) Patent No.: US 10,885,045 B2
(45) Date of Patent: Jan. 5, 2021

(54) METHOD AND SYSTEM FOR PROVIDING CONTEXT-BASED RESPONSE FOR A USER QUERY

(71) Applicant: Wipro Limited, Bangalore (IN)

(72) Inventors: Balaji Jagan, Bangalore (IN); Gopichand Agnihotram, Bangalore (IN); Meenakshi Sundaram Murugeshan, Bangalore (IN)

(73) Assignee: Wipro Limited, Bangalore (IN)

( * ) Notice: Subject to any disclaimer, the term of this patent is extended or adjusted under 35 U.S.C. 154(b) by 130 days.

(21) Appl. No.: 16/355,065

(22) Filed: Mar. 15, 2019

(65) Prior Publication Data

US 2020/0285648 A1  Sep. 10, 2020

(30) Foreign Application Priority Data

Mar. 7, 2019  (IN) .............................. 201941008949

(51) Int. Cl.
| | |
|---|---|
| *G06F 16/22* | (2019.01) |
| *G06F 16/2457* | (2019.01) |
| *G06N 7/00* | (2006.01) |
| *G06F 16/242* | (2019.01) |
| *G06N 20/00* | (2019.01) |
| *G06F 40/30* | (2020.01) |

(52) U.S. Cl.
CPC .... *G06F 16/24578* (2019.01); *G06F 16/2228* (2019.01); *G06F 16/2428* (2019.01); *G06F 40/30* (2020.01); *G06N 7/005* (2013.01); *G06N 20/00* (2019.01)

(58) Field of Classification Search
None
See application file for complete search history.

(56) References Cited

U.S. PATENT DOCUMENTS

| | | |
|---|---|---|
| 2010/0235164 A1 | 9/2010 | Todhunter et al. |
| 2011/0320187 A1 | 12/2011 | Motik et al. |
| 2012/0077178 A1 | 3/2012 | Bagchi et al. |
| 2013/0262501 A1 | 10/2013 | Kuchmann-Beauger et al. |

*Primary Examiner* — Rinna Yi
(74) *Attorney, Agent, or Firm* — Finnegan, Henderson, Farabow, Garrett & Dunner, LLP

(57) ABSTRACT

The present disclosure relates to method and system for providing context-based response for a user query. The method comprises generating current graphical structure for user query received from user which comprises one or more nodes corresponding to one or more words in the user query and one or more edges connecting the one or more nodes. Each node in the current graphical structure is associated with predefined indexing identification (ID) which is compared with predefined indexing IDs of one or more predefined graphical structures to identify one or more related predefined graphical structures. The one or more related predefined graphical structures are ranked based on number of predefined indexing IDs being matched. Based on comparison, system provides response corresponding to predefined question associated with related predefined graphical structure with highest rank. Therefore, present disclosure provides an efficient mechanism for providing context-based response to user queries.

15 Claims, 6 Drawing Sheets

METHOD AND SYSTEM FOR PROVIDING CONTEXT-BASED RESPONSE FOR A USER QUERY

TECHNICAL FIELD

The present subject matter is generally related to Artificial Intelligence based human machine interaction and more particularly, but not exclusively, to method and system for providing context-based response for a user query.

BACKGROUND

With the advent of new digital technologies, chatbot, Question & Answer (Q&A) system, information retrieval systems and the like are becoming prominent. Continuous efforts are made to make these systems more efficient and robust. Although, there are many systems that exist in this domain, but they are limited by unstructured data, fragmented information and limited scope of training and implementation. Due to these limitations, Q&A system or any existing system may render the response or information incorrectly. Sometimes, the Q&A systems may also fail to understand the user natural utterances, domain of user query and context, consequently rendering incorrect response.

Existing techniques discloses a mechanism for question answering system based on semantic labeling of text and linguistic analysis. Some other existing techniques disclose question answering system using parsing, pattern recognition and context aware input.

Though the existing techniques disclose the aspect of rendering response for user queries based on context aware input, the existing techniques fail to consider domain based semantic role of each word in user query. Also, the existing techniques fail to identify missing words in the query due to which the response may be rendered incorrectly.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of providing context-based response for a user query. The method comprises receiving, by a response generation system, the user query from a user. Thereafter, the method comprises generating a current graphical structure for the user query comprising one or more nodes corresponding to one or more words in the user query and one or more edges connecting the one or more nodes. Each node in the current graphical structure is associated with a predefined indexing identification (ID). The method further comprises comparing each predefined indexing ID of the current graphical structure with predefined indexing IDs of one or more predefined graphical structures to identify one or more related predefined graphical structures in the one or more predefined graphical structures. The one or more related predefined graphical structures are ranked based on number of predefined indexing IDs being matched, wherein each of the one or more predefined graphical structure is associated with a predefined question and a corresponding response. Based on the comparison, the method comprises providing a response corresponding to the predefined question associated with the related predefined graphical structure with highest rank among the one or more related predefined graphical structures.

Further, the present disclosure discloses a system for providing context-based response for a user query. The system comprises a processor and a memory. The memory is communicatively coupled to the processor and stores the processor-executable instructions, which, on execution, causes the processor to receive the user query from a user. Thereafter, the processor generates a current graphical structure for the user query comprising one or more nodes corresponding to one or more words in the user query and one or more edges connecting the one or more nodes. Each node in the current graphical structure is associated with a predefined indexing identification (ID). Once the current graphical structure is generated, the processor compares each predefined indexing ID of the current graphical structure with predefined indexing IDs of one or more predefined graphical structures to identify one or more related predefined graphical structures in the one or more predefined graphical structures. The one or more related predefined graphical structures are ranked based on number of predefined indexing IDs being matched. Each of the one or more predefined graphical structure is associated with a predefined question and a corresponding response. Thereafter, the processor provides a response corresponding to the predefined question associated with the related predefined graphical structure with highest rank among the one or more related predefined graphical structures.

Furthermore, the present disclosure comprises a non-transitory computer readable medium including instructions stored thereon that when processed by at least one processor causes a response generation system to perform operations comprising receiving the user query from a user. Further, the instructions cause the response generation system to generate a current graphical structure for the user query comprising one or more nodes corresponding to one or more words in the user query and one or more edges connecting the one or more nodes. Each node in the current graphical structure is associated with a predefined indexing identification (ID). Furthermore, the instructions cause the system to compare each predefined indexing ID of the current graphical structure with predefined indexing IDs of one or more predefined graphical structures to identify one or more related predefined graphical structures in the one or more predefined graphical structures. The one or more related predefined graphical structures are ranked based on number of predefined indexing IDs being matched. Each of the one or more predefined graphical structure is associated with a predefined question and a corresponding response. Finally, the instructions cause the system to provide a response corresponding to the predefined question associated with a related predefined graphical structure with highest rank among the one or more related predefined graphical structures.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1A:
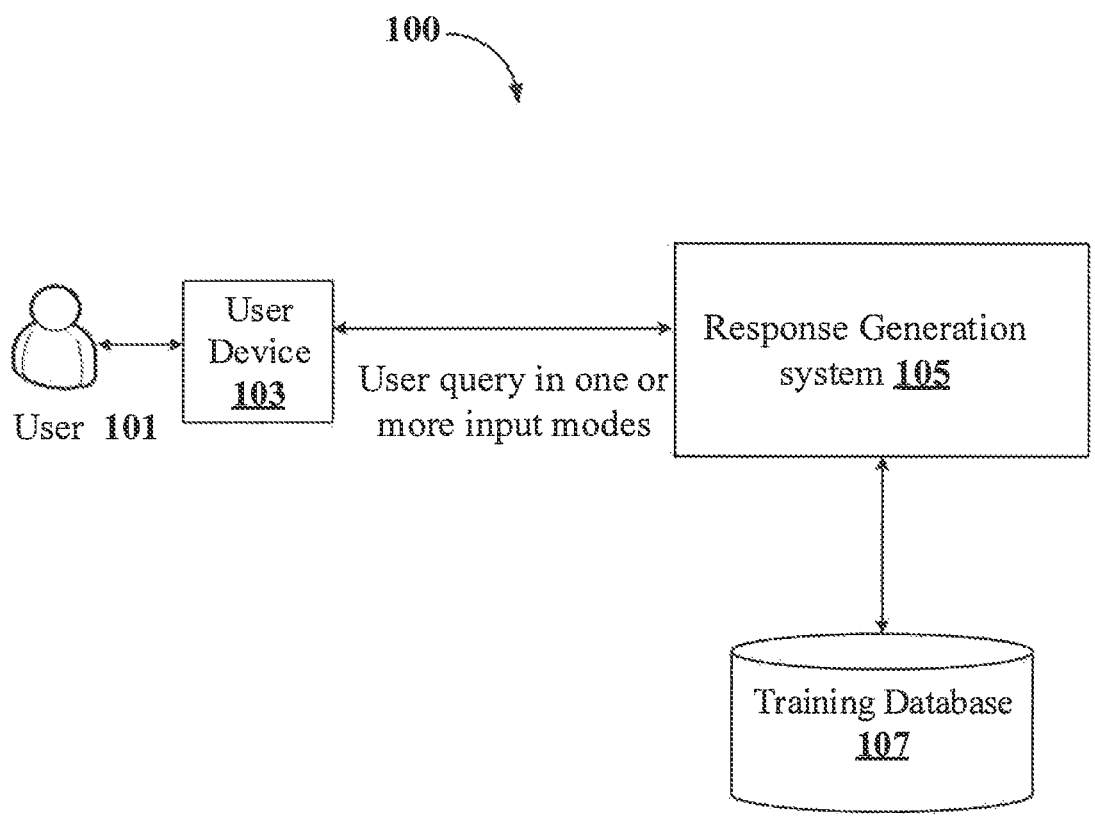
FIG. 1a shows an exemplary environment for providing context-based response for a user query in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for providing context-based response for a user query. The system, at first, may receive a user query from the user through a user device. The user query may be received in either text or speech mode. Thereafter, the system may identify one or more missing words in the user query using Hidden Markov Model (HMM) technique. If there are one or more missing words, the system may complete the user query by appending the one or more missing words. The Thereafter, the system may generate a current graphical structure for the user query comprising one or more nodes and one or more edges connecting the one or more nodes. The one or more nodes correspond to one or more words in the user query. Each node in the current graphical structure is associated with a predefined indexing identification (ID). As an example, the indexing identification may be a number. The system may then compare each predefined indexing ID of the current graphical structure with predefined indexing IDs of one or more predefined graphical structures to identify one or more related predefined graphical structures in the one or more predefined graphical structures. The predefined graphical structures may be generated for one or more predefined questions in one or more domains and are stored in a training database. Each predefined question is associated with a corresponding response.

The one or more related predefined graphical structures may be ranked based on number of predefined indexing IDs being matched. In an embodiment, the system identifies one or more missing words in the user query and appends the user query with missing words using Hidden Markov Model (HMM). The system may provide a response corresponding to the predefined question associated with the related predefined graphical structure with highest rank among the one or more related predefined graphical structures. In this manner, the present disclosure provides method and system for efficiently providing context-based response for user queries and thereby increasing the user experience with Q&A system.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows an exemplary environment for providing context-based response for a user query in accordance with some embodiments of the present disclosure.

As shown in FIG. 1a, the exemplary environment may include a user 101, a user device 103, a response generation system 105 (alternatively referred as system) and a training database 107. The user 101 may provide a user query through the user device. The user device 103 may include, but not limited to, computer, laptop, mobile phone and tablet. The user 101 may provide the user query in one or more input modes. As an example, the input mode may be in form of a text or speech. If the received user query is in the form a speech input, the system 105 may convert the speech input into text input for further processing. Once the user query is received, the response generation system 105 may identify one or more missing words in the user query using a Hidden Markov Model (HMM). The one or more missing words may be identified based on comparison of the user query and predefined user query stored in the training database 107. The predefined query may be identified based on domain of the user query. If there are one or more missing words, the system 105 may complete the user query by appending the one or more missing words in the user query.

Thereafter, the response generation system 105 may generate a current graphical structure for the user query. The current graphical structure may include one or more nodes corresponding to one or more words in the user query. The current graphical structure may also include edges connecting the one or more nodes. The edges may indicate association between the connecting nodes in terms of association weightage value i.e. association between the words mapped with the nodes.

Figure 1B:
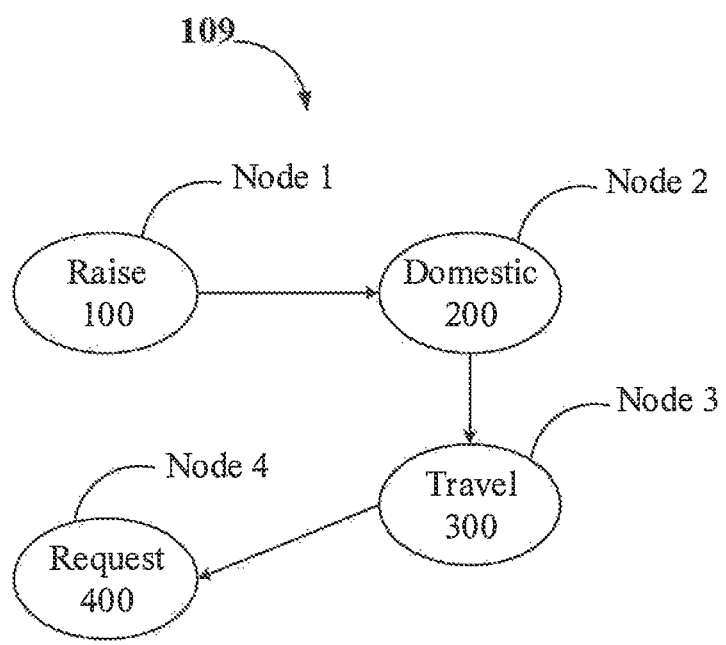
FIG. 1b shows an exemplary current graphical structure generated for a user query in accordance with some embodiments of the present disclosure.

As an example, the user query may be "How to raise the domestic travel request". The connecting words such as "to", "the", "in", "a" and other words such as "how", "what", "when", "who" may be omitted by the system 105 and only the words which provides semantic information such as role of the word, agent in the user query, result of the user query and goal of the user query may be considered. As an example, the user query may include one or more words such as "raise", "domestic", "travel" and "request". Since there are 4 words in the user query, the current graphical structure may include 4 nodes corresponding to each word and edges connecting them. An exemplary current graphical structure is shown in FIG. 1*b*. In an embodiment, each node in the current graphical structure is associated with a predefined indexing ID. As an example, the predefined indexing ID may include but are not limited to, number, alphabets and alpha-numerals. As an example, the predefined indexing ID associated with node 1 "raise" may be 100, the predefined indexing ID associated with node 2 "domestic" may be 200, the predefined indexing ID associated with node 3 "travel" may be 300 and the predefined indexing ID associated with node 4 "request" may be 400. The predefined indexing ID may be mapped with one or more features which includes, but not limited to, Part of Speech (POS) tag, one or more semantic features, morphological suffixes, stemming and Named Entity Recognition (NER).

In an embodiment, the system 105 may compare each predefined indexing ID of the current graphical structure with predefined indexing IDs of one or more predefined graphical structures to identify one or more related predefined graphical structures in the one or more predefined graphical structures. The one or more predefined graphical structures are generated and stored in the training database 107. Each of the one or more predefined graphical structures is associated with a predefined question and a corresponding response. The training database 107 may include one or more graphical structures corresponding to predefined questions from various domains.

In an embodiment, each of the one or more predefined graphical structure is associated with a predefined indexing ID. The system 105 may compare each predefined indexing ID of the current graphical structure with predefined indexing IDs of the one or more predefined graphical structures to identify one or more related predefined graphical structures in the one or more predefined graphical structures. As an example, there may be one or more predefined graphical structures whose predefined indexing ID match with the predefined indexing ID of the current graphical structure. The system 105 may identify those predefined graphical structures as one or more related predefined graphical structures. Each of the one or more related predefined graphical structures may be ranked based on number of predefined indexing IDs being matched.

In an embodiment, the related predefined graphical structure with highest number of predefined indexing ID being matched with the predefined indexing ID of the current graphical structure is ranked highest. As an example, the user query may be "How to raise the domestic travel request". The current graphical structure for this user query is as illustrated in FIG. 1*b*. The predefined indexing ID of the current graphical structure is compared with predefined indexing IDs of the one or more predefined graphical structures such as predefined graphical structure 1 to predefined graphical structure 4 stored in the training database 107. Based on the comparison, the system 105 may identify that there may be two related predefined graphical structures, predefined graphical structure 3 and graphical structure 4. The predefined graphical structure 3 and graphical structure 4 may be ranked based on number of predefined indexing IDs being matched. As an example, predefined graphical structure 3 may be ranked highest since most of the predefined indexing IDs of the predefined graphical structure 3 match with the predefined indexing ID of the current graphical structure. The system 105 may select the graphical structure with highest rank among the other related graphical structure which in this scenario is graphical structure 3. The system 105 may identify the predefined question corresponding to the graphical structure 3. Once the predefined question is identified, the system 105 may obtain the corresponding response and provide the response as the response for the user query. In this manner, the present disclosure provides an efficient mechanism to provide response to the user query based on context of the user query and by identifying missing words, if any, in the user query.

Figure 2A:
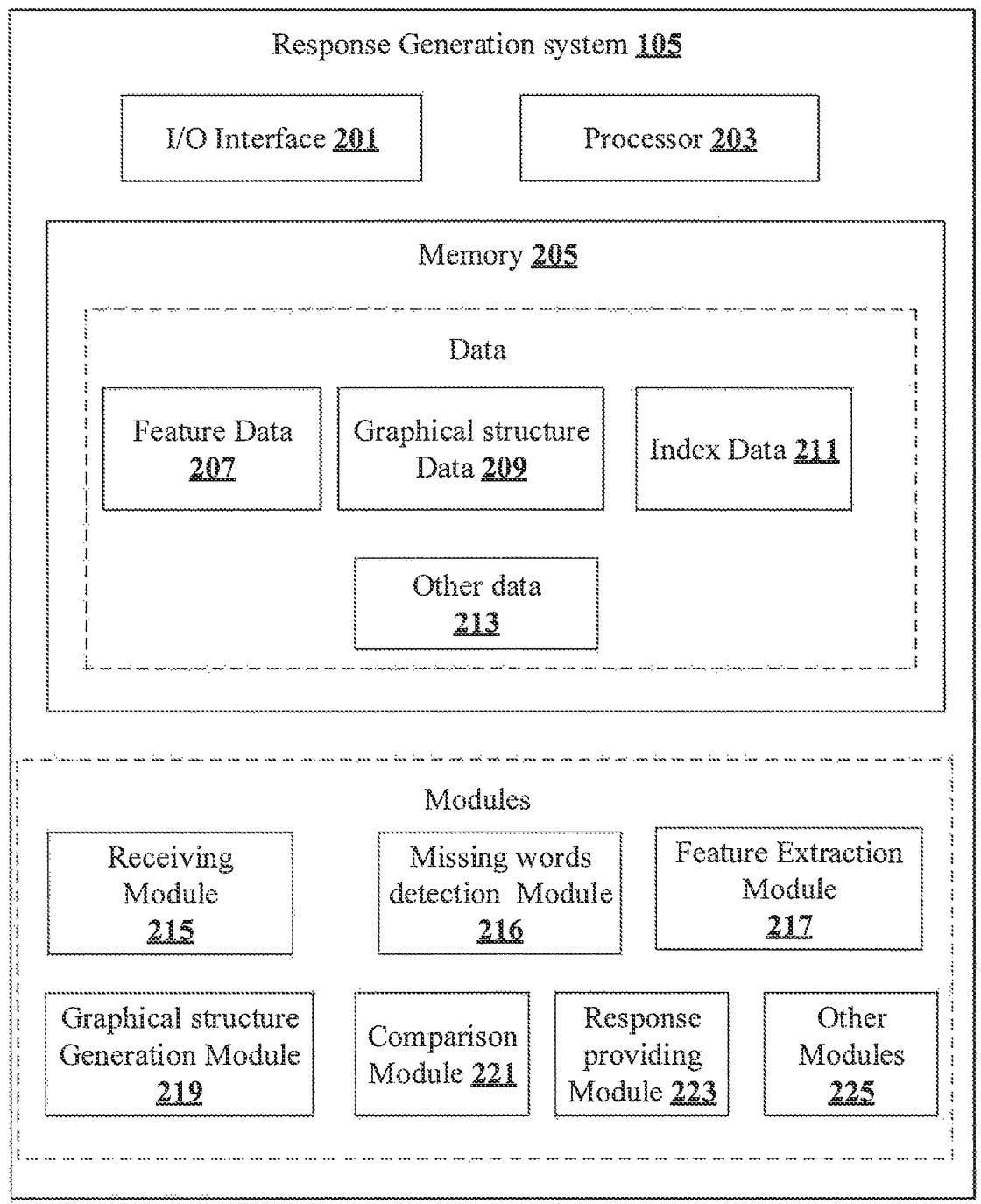
FIG. 2a shows block diagram of a response generation system in accordance with some embodiments of the present disclosure.

FIG. 2*a* shows block diagram of a response generation system 105 in accordance with some embodiments of the present disclosure.

The response generation system 105 may include an I/O interface 201, a processor 203, and a memory 205. The I/O interface 201 may be configured to receive a user query and to provide context-based response for the user query. The memory 205 may be communicatively coupled to the processor 203. The processor 203 may be configured to perform one or more functions of the response generation system 105.

In some implementations, the response generation system 105 may include data and modules for performing various operations in accordance with embodiments of the present disclosure. In an embodiment, the data may be stored within the memory 205 and may include, without limiting to, feature data 207, graphical structure data 209, index data 211 and other data 213.

In some embodiments, the data may be stored within the memory 205 in the form of various data structures. Additionally, the data may be organized using data models, such as relational or hierarchical data models. The other data 213 may store data, including temporary data and temporary files, generated by the modules for performing various functions of the response generation system 105.

In an embodiment, one or more modules may process the data of the response generation system 105. In one implementation, the one or more modules may be communicatively coupled to the processor 203 for performing one or more functions of the response generation system 105. The modules may include, without limiting to, a receiving module 215, missing words detection module 216, a feature extraction module 217, a graphical structure generation module 219, a comparison module 221, a response providing module 223 and other modules 225.

As used herein, the term module refers to an Application Specific Integrated Circuit (ASIC), an electronic circuit, a processor 203 (shared, dedicated, or group) and memory 205 that execute one or more software or firmware programs, a combinational logic circuit, and/or other suitable components that provide the described functionality. In an embodiment, the other modules 225 may be used to perform various miscellaneous functionalities of the response generation system 105. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the receiving module 215 may be configured to receive user query. The user query may be in the form of a text or a speech. The speech may be converted by the system 105 into text for further processing.

In an embodiment, the missing words detection module 216 may be configured to detect one or more missing words in the user query. The missing words detection module 216 may compare an input frame comprising one or more slots for one or more words in the user query with an input frame corresponding to a predefined question stored in the training database 107. The missing words detection module 216 may detect one or more missing words in the user query upon identifying vacancy in the one or more input slots of the input frame associated with the user query based on the comparison. If the one or more missing words are detected, the system 105 may complete the user query by appending the one or more missing words in the one or more input slots of the input frame associated with the user query using a Hidden Markov Model (HMM) technique. The one or more missing words may be appended based on association weightage value of the one or more missing words with words stored in the training database 107. The association weightage value is determined based on frequency of occurrence of the one or more missing words with words stored in the training database 107. As an example, the received user query may be "How to raise travel request" which comprises 4 input slots for words "how", "raise", "travel" and "request". The user query may be compared with one or more predefined questions, predefined question 1 and predefined question 2 in the database. The predefined questions may be identified based on domain of the user query. The predefined question 1 identified may be "How to raise domestic travel request" which comprises 5 input slots for the words "how", "raise", "domestic", "travel" and "request". Similarly, predefined question 2 may be the "How to raise international travel request" which comprises 5 input slots for the words "how", "raise", "international", "travel" and "request". Based on the comparison, the system 105 may detect vacancy in the input slot corresponding to the word "domestic" and "international" and hence detects that the word "domestic/international" is missing. In an embodiment, the association weightage value for the word "domestic" with the words "raise", "travel" and "request" may be 0.85, 0.95 and 0.75 respectively. Similarly, the association weightage value for the word "international" with the words "raise", "travel", and "request" may be 0.75, 0.5 and 0.5 respectively. The association weightage value for the word "domestic" with other words in the user query is high and hence the word "domestic" may be appended in the user query. Once the user query is completed, the completed user query is further processed for feature extraction.

In an embodiment, the feature extraction module 217 may be configured to extract one or more features from the user query. The one or more features may include, but not limited to, Part of Speech (POS) tag, one or more semantic features, morphological suffixes, stemming and Named Entity Recognition (NER). The extracted features may be stored as the feature data 207.

As an example, the user query may be "How to raise the domestic travel request". The user query comprises one or more words such as "how", "raise", "domestic", "travel" and "request". The feature extraction module 217 may extract one or more features for the user query such as POS tag, NER, morphological suffixes, stemming, domain of the user query and semantic features for each word.

In an embodiment, the graphical structure generation module 219 may be configured to generate a current graphical structure for the user query. The generated current graphical structure is stored as the graphical structure data 209. The exemplary current graphical structure is as shown in FIG. 1b. As shown in FIG. 1b, the current graphical structure comprises nodes and edges. The nodes represent the words in the user query. However, for the connecting words such as "a", "the", "and", "then", "but", the nodes would not be formed. The edges connect the nodes in the current graphical structure and may indicate association between the connecting nodes in terms of association weightage value. As shown in FIG. 1b, the current graphical structure comprises 4 nodes corresponding to the words "raise", "domestic", "travel" and "request".

Each node in the current graphical structure is associated with a predefined indexing ID. The predefined indexing ID is stored as index data 211. As an example, the predefined indexing ID may be a number. Each predefined indexing ID associated with each node is mapped with its corresponding one or more features. An exemplary predefined indexing ID assigned for each node is as shown in FIG. 1b.

In an embodiment, the comparison module 221 may be configured to compare the predefined indexing ID of each node in the current graphical structure with the predefined indexing ID of the one or more predefined graphical structures. The one or more predefined graphical structures are stored in the training database 107. Each predefined graphical structure is generated and stored for each predefined question. The training database 107 may comprise plurality of predefined graphical structures. Each predefined graphical structure may correspond to a predefined question wherein each predefined question is associated with a predefined response. Based on the comparison, the comparison module 221 may identify one or more related predefined graphical structures from among the one or more graphical structures in which most of the predefined indexing ID matches.

In an embodiment, the response providing module 223 may be configured to provide the response to the user query. Each predefined related graphical structure is ranked based on the number of predefined indexing IDs being matched with the indexing ID of the current graphical structure. The response providing module 223 may identify one of the one or more related graphical structure with highest rank and identify the corresponding predefined question. The one of the one or more related graphical structure may be ranked highest if most of the predefined indexing IDs of the related graphical structure matches with the predefined indexing ID of the current graphical structure when compared to other related graphical structures.

Thereafter, the response providing module 223 may provide the response corresponding to the identified predefined question as the response for the user query.

Exemplary Embodiment

As an example, the user 101 may provide the user query to the response generation system 105 as provided below.

User Query: How to raise the domestic travel request?

In an embodiment, once the user query is received, the response generation system may detect one or more missing words in the user query. If the one or more missing words are detected, the system may complete the user query by appending the missing words using the HMM technique. Thereafter, the response generation system 105 extracts one or more features from the user query as provided below.

1. PoS tag for each word: How: Adverb; raise: Verb; Domestic: Adjective; travel: Noun; request: Noun.
2. Domain of the user query: The word "Travel"
3. Morphological suffixes: As an example, the morphological suffix for the word "Raise" may be "Raises"
4. Stemming: As an example, the stemming for the word "Request" may be "Requested"
5. NER (Named Entity Recognition): The word "Domestic". The NER indicates entities such as name of a person, organization and time.
6. Semantic Features: Raise—(boost, apply, hike, increment, accession); Domestic—(private, calm family); Travel—(driving, excursion, flying, movement, navigation, ride, sailing, sightseeing). The semantic features indicate similar words used for the word in the given domain.

Once the one or more features are extracted, the response generation system 105 generates current graphical structure for the user query as shown in FIG. 1*b*. The current graphical structure comprises one or more nodes corresponding to one or more words in the user query and comprises one or more edges connecting the one or more nodes. Each node in the current graphical structure is associated with a predefined indexing ID. The exemplary predefined indexing ID for each node is indicated in FIG. 1*b*. Further, each predefined indexing ID associated with each node is mapped with its corresponding one or more features extracted as illustrated above.

The response generation system 105 compares the predefined ID of the current graphical structure with predefined IDs of the one or more predefined graphical structures. The predefined graphical structures correspond to predefined questions. As an example, there may be one or more domains and, in each domain, there may be one or more predefined questions. For example, in travel domain, the one or more predefined questions may be "How to raise the domestic travel request", "How to apply for a domestic travel ticket", "What is the cost of travel ticket" and the like. Similarly, there may be predefined number of questions in other domain such as "Finance". The predefined questions may be "I want to know fees and charges of Essentia Platinum Credit Card", "How to raise a request for a credit card", "What are the credit card offers" and the like. Each predefined question is associated with a corresponding response. The predefined question, the corresponding response and the predefined graphical structure is stored in the training database 107.

For the purpose of illustration, the training database 107 may include three predefined graphical structures, predefined graphical structure 1, predefined graphical structure 2 and predefined graphical structure 3.

The predefined graphical structure 1 may correspond to the predefined question and response as provided below:

Associated Question: I want to know fees and charges of platinum credit card

Associated response: It has a joining fee of INR 1599 and an annual fee of INR 849. Do you wish to apply for it!

The predefined graphical structure 2 may correspond to the predefined question and response as provided below:

Associated Question: How to apply a request for travel?

Associated response: These steps will help you to raise the request. Myapplication→App store→MyTravel→Travel→Select the travel type as domestic/international→Proceed further.

The predefined graphical structure 3 may correspond to the predefined question and response as provided below:

Associated Question: How to book a travel ticket?

Associated response: These steps will help you. Myapplication→App store→MyTravel→Travel→Select the travel type as domestic/international→Proceed further.

Figure 2B:
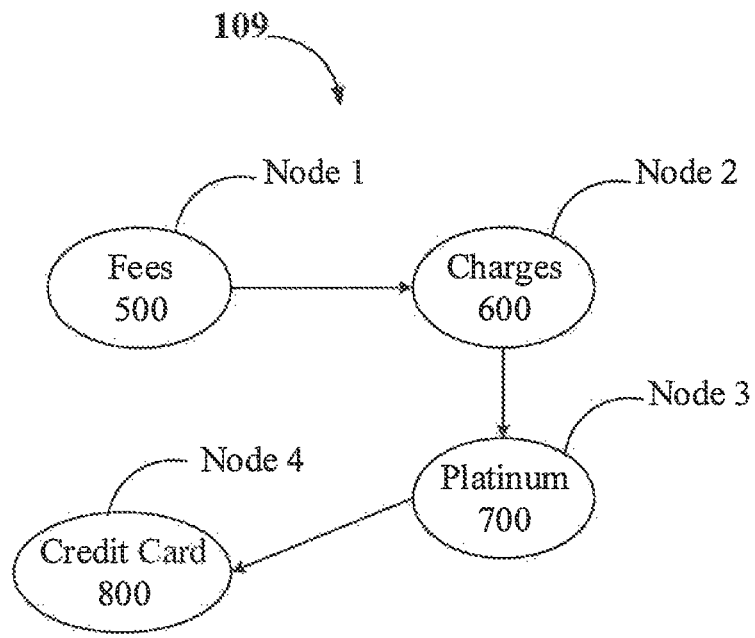
FIGS. 2b-2d show exemplary predefined graphical structures generated in accordance with some embodiments of the present disclosure.

The predefined graphical structure 1 may comprise 4 nodes corresponding to 4 words "fees", "charges", "platinum" and "credit card" and the edges connecting the nodes. Each node is associated with a predefined indexing ID. As an example, the predefined indexing ID assigned for node 1 "fees" is 500, the predefined indexing ID assigned for node 2 "charges" is 600, the predefined indexing ID assigned for node 3 "platinum" is 700 and the predefined indexing ID assigned for node 4 "fees" is 800 as shown in FIG. 2*b*.

Figure 2C:
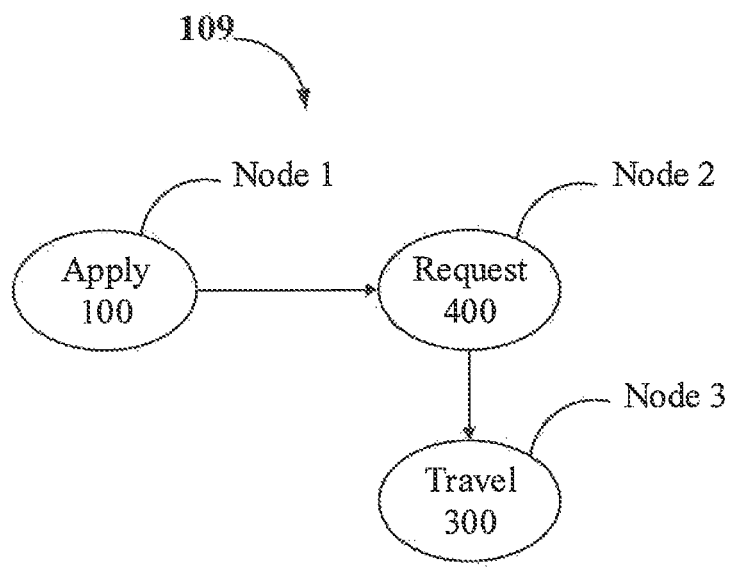

Similarly, the predefined graphical structure 2 may comprise 3 nodes corresponding to 3 words "apply", "request", "travel" and the edges connecting the nodes. Each node is associated with a predefined indexing ID. As an example, the predefined indexing ID assigned for node 1 "apply" is 100, the predefined indexing ID assigned for node 2 "request" is 400, the predefined indexing ID assigned for node 3 "travel" is 300 as shown in FIG. 2*c*. The predefined indexing ID associated with the node 1 "apply" is same as the predefined indexing ID associated with node corresponding to the word "raise" as the words "apply" and "raise" are the semantic features or the synonyms.

Figure 2D:
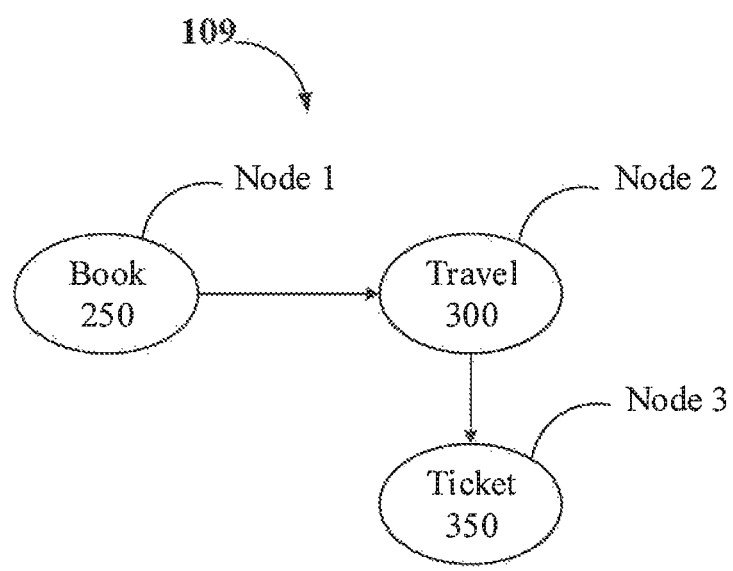

The predefined graphical structure 3 may comprise 3 nodes corresponding to 3 words "book", "travel" and "ticket" and the edges connecting the nodes as shown in FIG. 2*d*. Each node is associated with a predefined indexing ID. As an example, the predefined indexing ID assigned for node 1 "book" is 250, the predefined indexing ID assigned for node 2 "travel" is 300 and the predefined indexing ID assigned for node 3 "ticket" is 350 as shown in FIG. 2*d*.

The predefined indexing ID of the current graphical structure is compared with the predefined indexing IDs of the three predefined graphical structures to identify one or more related predefined graphical structures. The system 105 may identify two related predefined graphical structures, related predefined graphical structure 2 and related graphical structure 3 based on the match of the predefined indexing IDs i.e. the predefined indexing ID of the current graphical structure matches with predefined indexing IDs of two related predefined graphical structures. Based on the number of predefined indexing IDs being matched, the related predefined indexing IDs are ranked. As an example, when the predefined indexing ID of the current graphical structure is compared with predefined indexing ID of related predefined graphical structure 2, then 3 predefined indexing IDs are matched. When the predefined indexing ID of the current graphical structure is compared with predefined indexing ID of related predefined graphical structure 3, then 1 predefined indexing ID is matched. Therefore, the related predefined graphical structure 2 is ranked first and the related graphical structure 3 is ranked second. Since the related predefined graphical structure 2 is ranked highest among the related graphical structure 2 and the related predefined graphical structure 3, the related predefined graphical structure 2 is selected.

The corresponding predefined question associated with the related predefined graphical structure 2 is "How to apply a request for travel". The response corresponding to the predefined question is "These steps will help you to raise the request. Myapplication→App store→MyTravel→Travel→select the travel type as domestic/international→proceed further". The system 105 obtains the response corresponding to the predefined question and provides the response as the response for the user query. In this manner, the present disclosure efficiently provides context-based response for the user query.

Figure 3:
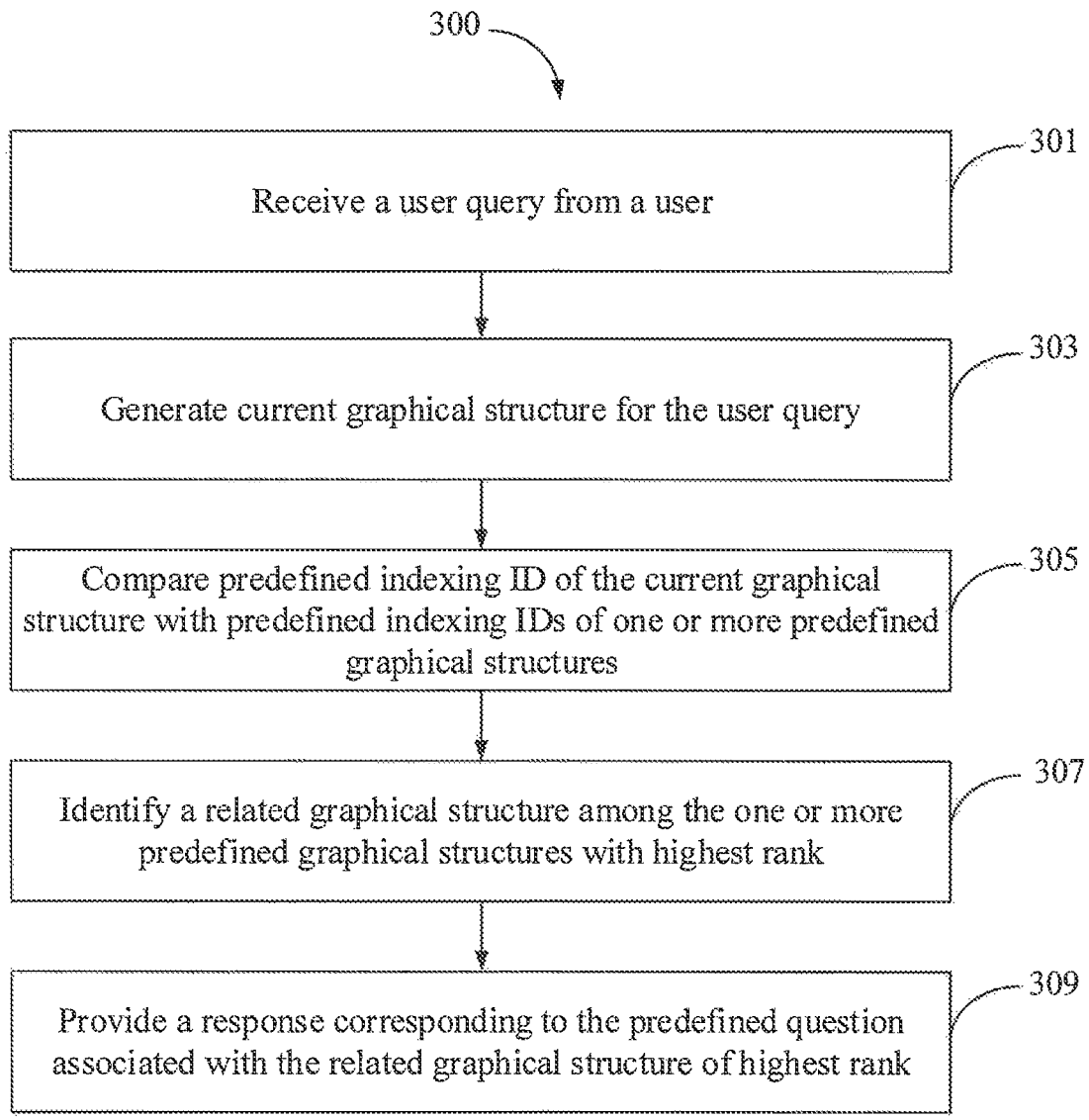
FIG. 3 shows a flowchart illustrating method of providing context-based response for a user query in accordance with some embodiments of the present disclosure.

FIG. 3 shows a flowchart illustrating method of providing context-based response for a user query in accordance with some embodiments of the present disclosure.

As illustrated in FIG. 3, the method 300 includes one or more blocks illustrating a method of providing context-based response for a user query. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 may include receiving user query from a user 101. The user may provide user query related to any domain. As an example, the user 101 may provide user query in the travel domain and the exemplary user query may be "how to raise a domestic travel ticket". In an embodiment, once the user query is received, the system 105 may detect for one or more missing words in the user query using HMM technique.

At block 303, the method 300 may include generating a current graphical structure for the user query. The current graphical may be generated by the system 105 for the user query. The current graphical structure may include one or more nodes and one or more edges. The edges connect the one or more nodes. The one or more nodes in the current graphical structure corresponds to one or more words in the user query. Each node is associated with a predefined indexing ID. The predefined indexing ID may be based on one or more features extracted from the user query. The one or more features may include, but not limited to, Part of Speech (POS) tag, one or more semantic features, morphological suffixes, stemming and Named Entity Recognition (NER).

At block 305, the method 300 may include comparing the predefined indexing ID of the current graphical structure with predefined indexing IDs of one or more predefined graphical structures. The one or more predefined graphical structures are generated and stored in a training database 107 associated with the system 105. The one or more predefined graphical structures correspond to predefined questions in one or more domains. Each predefined question is associated with a corresponding response.

At block 307, the method 300 may include identifying one or more related graphical structures among the one or more predefined graphical structure based on the comparison. Each of the one or more related graphical structure is ranked based on number of predefined indexing IDs being matched.

At block 309, the method 300 may include identifying one of the one or more related graphical structure with highest rank and providing the response corresponding to the predefined question associated with the related graphical structure with highest rank.

Computer System

Figure 4:
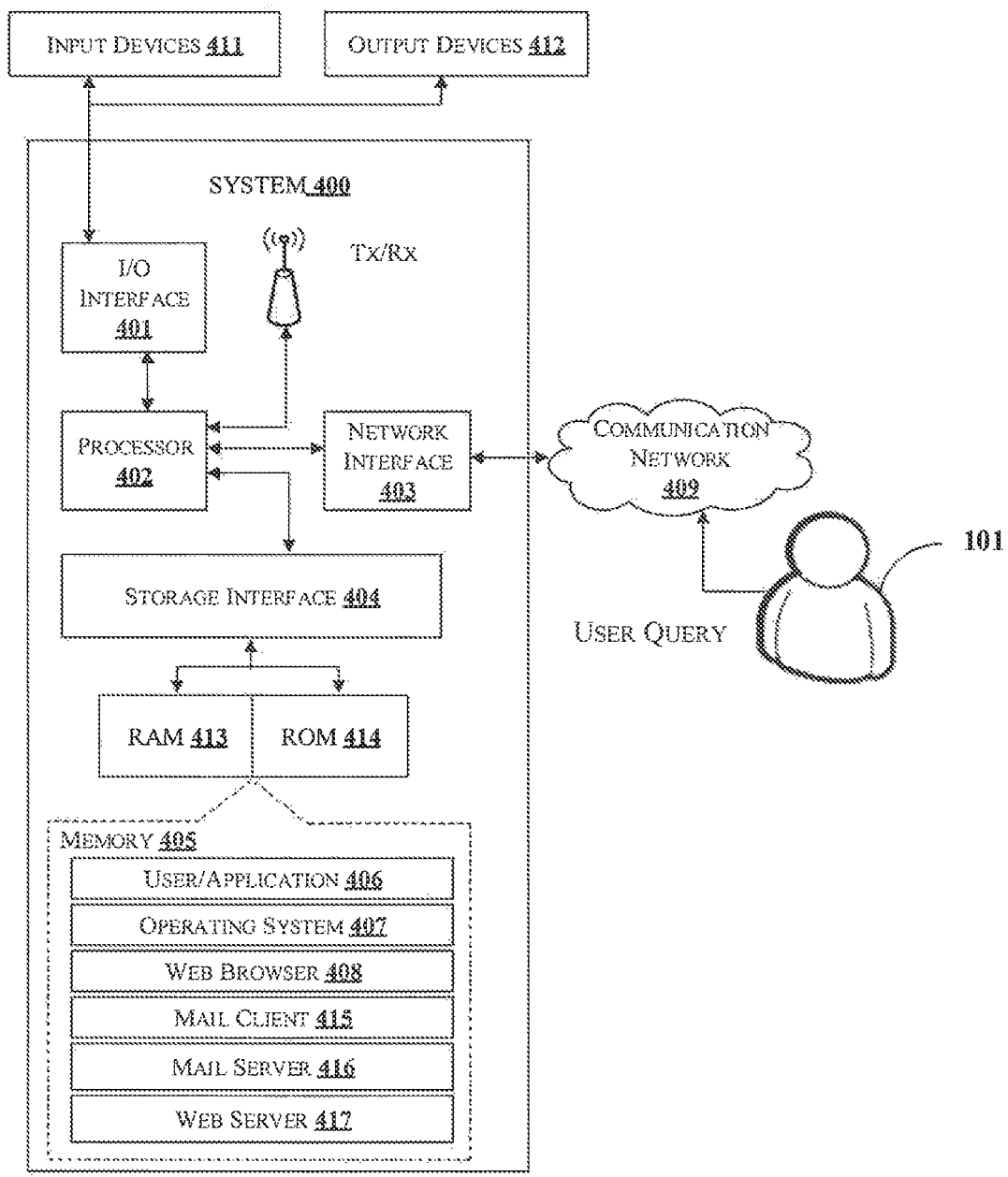
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be response generation system 105, which is used for providing a context-based response for a user query. The computer system 400 may include a central processing unit ("CPU" or "processor") 402. The processor 402 may comprise at least one data processor for executing program components for executing user or system-generated business processes. A user 101 may include a person, a user 101 in the computing environment 100, a user 101 querying the response generation system 105, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone, a laptop, or a desktop computer associated with the user 101, through which the user 101 interacts with the response generation system 105.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 101 to receive the query and to provide the context-based response.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method for providing context-based response to user query.

In an embodiment, the present disclosure identifies missing words in the user query and appends missing words and thereafter renders the response for the user query. Hence, the user query is rendered correctly for providing the response.

In an embodiment, the present disclosure identifies domain of the query and also generates a graphical structure representing semantic labelling of each word in the query to provide the response efficiently.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Reference Number | Description |
| --- | --- |
| 100 | Environment |
| 101 | User |
| 103 | User Device |
| 105 | Response generation system |
| 107 | Training database |
| 201 | I/O Interface |
| 103 | Processor |
| 205 | Memory |
| 207 | Feature Data |
| 209 | Graphical structure data |
| 211 | Index Data |

-continued

| Reference Number | Description |
| --- | --- |
| 213 | Other data |
| 215 | Receiving module |
| 216 | Missing words detection module |
| 217 | Feature extraction module |
| 219 | Graphical structure generation module |
| 221 | Comparison module |
| 123 | Response providing module |
| 225 | Other modules |
| 500 | Exemplary computer system |
| 501 | I/O Interface of the exemplary computer system |
| 502 | Processor of the exemplary computer system |
| 501 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |
| 515 | Mail Client |
| 516 | Mall Server |
| 517 | Web Server |

What is claimed is:

1. A method of providing a context-based response for a user query, the method comprising:
receiving, by a response generation system, the user query from a user;
generating, by the response generation system, a current graphical structure for the user query comprising one or more nodes corresponding to one or more words in the user query and one or more edges connecting the one or more nodes, wherein each node in the current graphical structure is associated with a predefined indexing identification (ID);
comparing, by the response generation system, each predefined indexing ID of the current graphical structure with predefined indexing IDs of one or more predefined graphical structures to identify one or more related predefined graphical structures in the one or more predefined graphical structures, wherein the one or more related predefined graphical structures are ranked based on number of predefined indexing IDs being matched, wherein each of the one or more predefined graphical structure is associated with a predefined question and a corresponding response;
comparing, by the response generation system, an input frame comprising one or more slots for one or more words in the user query with the input frame corresponding to a predefined question stored in a training database associated with the response generation system;
detecting, by the response generation system, one or more missing words in the user query upon identifying vacancy in the one or more input slots of the input frame associated with the user query based on the comparison;
correcting, by the response generation system, the user query, by appending the one or more missing words in the one or more input slots of the input frame using a Hidden Markov Model (HMM) technique based on association weightage value of the one or more missing words with each word in the user query; and
providing, by the response generation system, a response corresponding to the predefined question associated with a related predefined graphical structure with highest rank among the one or more related predefined graphical structures.

2. The method as claimed in claim 1, wherein the user query is received in at least one of one or more input modes comprising text and speech.

3. The method as claimed in claim 1, wherein the association weightage value is based on frequency of occurrence of the one or more missing words with words in previous user queries together.

4. The method as claimed in claim 1, wherein the one or more predefined graphical structures comprising one or more nodes are generated for one or more predefined questions in each of one or more domains, wherein the one or more nodes correspond to one or more words in the predefined question.

5. The method as claimed in claim 4, wherein the predefined indexing ID associated with each node in each of the one or more predefined graphical structures is mapped with one or more features corresponding to the one or more words.

6. The method as claimed in claim 5, wherein the one or more features comprises at least one of Part of Speech (POS) tag, one or more semantic features, morphological suffixes, stemming and Named Entity Recognition (NER).

7. The method as claimed in claim 1, wherein the current graphical structure is generated based on semantic role labelling technique.

8. A response generation system for providing a context-based response for a user query, the response generation system comprising:
a processor; and
a memory communicatively coupled to the processor, wherein the memory stores the processor-executable instructions, which, on execution, causes the processor to:
receive the user query from a user;
generate a current graphical structure for the user query comprising one or more nodes corresponding to one or more words in the user query and one or more edges connecting the one or more nodes, wherein each node in the current graphical structure is associated with a predefined indexing Identification (ID);
compare each predefined indexing ID of the current graphical structure with predefined indexing IDs of one or more predefined graphical structures to identify one or more related predefined graphical structures in the one or more predefined graphical structures, wherein the one or more related predefined graphical structures are ranked based on number of predefined indexing IDs being matched, wherein each of the one or more predefined graphical structure is associated with a predefined question and a corresponding response;
compare an input frame comprising one or more slots for one or more words in the user query with the input frame corresponding to a predefined question stored in a database associated with the system;
detect one or more missing words in the user query upon identifying vacancy in the one or more input slots of the input frame associated with the user query based on the comparison;
correct the user query by appending the one or more missing words in the one or more input slots of the input frame using a Hidden Markov Model (HMM)

technique based on association weightage value of the one or more missing words with each word in the user query; and provide a response corresponding to the predefined question associated with a related predefined graphical structure with highest rank among the one or more related predefined graphical structures.

9. The response generation system as claimed in claim 8, wherein the processor receives the user query in at least one of one or more input modes comprising text and speech.

10. The response generation system as, claimed in claim 8, wherein the association weightage value is based on frequency of occurrence of the one or more missing words with words in previous user queries together.

11. The response generation system as claimed in claim 8, wherein the processor generates one or more predefined graphical structures comprising one or more nodes for one or more predefined questions in each of one or more domains, wherein the one or more nodes correspond to one or more words in the predefined question.

12. The response generation system as claimed in claim 11, wherein the processor maps predefined indexing ID associated with each node in each of the one or more predefined graphical structures with one or more features corresponding to the one or more words.

13. The response generation system as claimed in claim 12, wherein the one or more features comprises at least one of Part of Speech (POS) tag, one or more semantic features, morphological suffixes, stemming and Named Entity Recognition (NER).

14. The system as claimed in claim 8, wherein the processor generates the current graphical structure based on semantic role labeling technique.

15. A non-transitory computer readable medium including instructions stored thereon that when processed by at least one processor causes a response generation system to:

receive the user query from a user;

generate a current graphical structure for the user query comprising one or more nodes corresponding to one or more words in the user query and one or more edges connecting the one or more nodes, each node in the current graphical structure is associated with a predefined indexing identification (ID);

compare each predefined indexing ID of the current graphical structure with predefined indexing IDs of one or more predefined graphical structures to identify one or more related predefined graphical structures in the one or more predefined graphical structures, the one or more related predefined graphical structures are ranked based on number of predefined indexing IDs being matched, each of the one or more predefined graphical structure is associated with a predefined question and a corresponding response; and compare an input frame comprising one or more slots for one or more words in the user query with the input frame corresponding to a predefined question stored in a database associated with the system;

detect one or more missing words in the user query upon identifying vacancy in the one or more input slots of the input frame associated with the user query based on the comparison;

correct the user query by appending the one or more missing words in the one or more input slots of the input frame using a Hidden Markov Model (HMM) technique based on association weightage value of the one or more missing words with each word in the user query; and provide a response corresponding to the predefined question associated with a related predefined graphical structure with highest rank among the one or more related predefined graphical structures.

* * * * *